United States Patent [19]

Leiber

[11] Patent Number: 4,809,807
[45] Date of Patent: Mar. 7, 1989

[54] CONTROL FOR THE AUTOMATIC LOCKING OF THE TRANSFER TRANSMISSION OF A MOTOR VEHICLE

[75] Inventor: Heinz Leiber, Oberriexingen, Fed. Rep. of Germany

[73] Assignee: Daimler-Benz Aktiengesellschaft, Stuttgart, Fed. Rep. of Germany

[21] Appl. No.: 206,974

[22] Filed: Jun. 14, 1988

Related U.S. Application Data

[63] Continuation of Ser. No. 943,692, Dec. 19, 1986, abandoned.

[30] Foreign Application Priority Data

Dec. 21, 1985 [DE] Fed. Rep. of Germany ....... 3545544

[51] Int. Cl.⁴ ............................................. B60K 17/34
[52] U.S. Cl. .................................... 180/197; 180/248; 180/249
[58] Field of Search ........................ 180/197, 249, 248

[56] References Cited

U.S. PATENT DOCUMENTS

| | | | |
|---|---|---|---|
| 3,802,529 | 4/1974 | Burckardt et al. | 180/197 |
| 4,552,241 | 11/1985 | Suzuki | 180/197 |
| 4,566,554 | 1/1986 | Suzuki | 180/249 |
| 4,576,061 | 3/1986 | Yamakawa et al. | 74/665 T |
| 4,589,511 | 5/1986 | Leiber | 180/197 |

Primary Examiner—David M. Mitchell
Assistant Examiner—Donn McGiehan
Attorney, Agent, or Firm—Barnes & Thornburg

[57] ABSTRACT

Control for the automatic locking of the transfer transmission of a motor vehicle equipped with a multi-axle drive, having a wheel slip control system for the wheels of one axle and having an electronic unit that carries out a comparison of a quantity determined from the steering angle and the rotational speed difference of the wheels of the other axle that characterizes the moving condition of the motor vehicle with a limit value assigned to the steering angle and the driving speed. Control signal for the lock of the transfer transmission is generated when a control signal of the wheel slip control system is present or the quantity characterizing the moving condition of the motor vehicle exceeds the limit value.

2 Claims, 1 Drawing Sheet

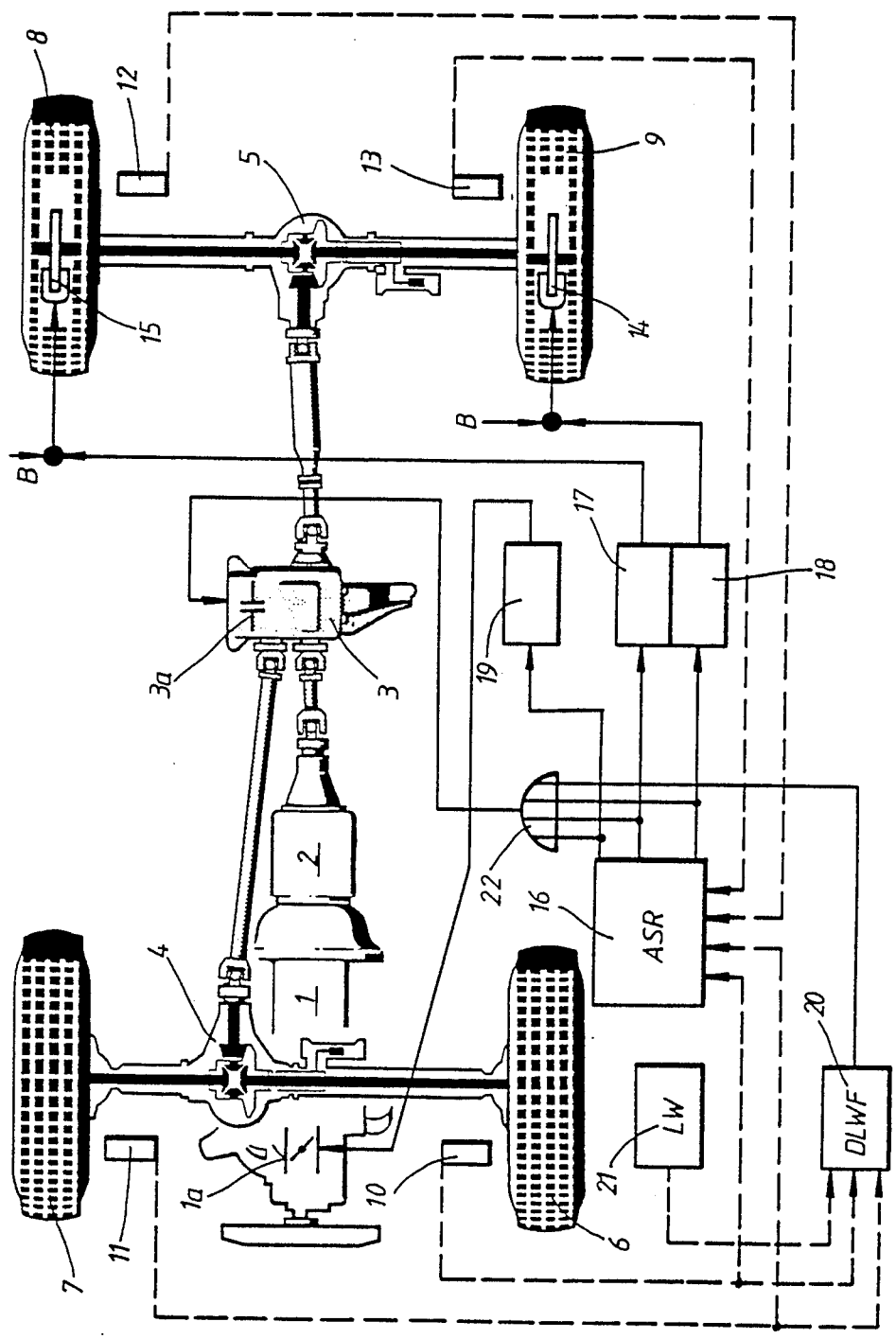

CONTROL FOR THE AUTOMATIC LOCKING OF THE TRANSFER TRANSMISSION OF A MOTOR VEHICLE

This is a continuation of application Ser. No. 943,692 filed Dec. 19, 1986 now abandoned.

BACKGROUND AND SUMMARY OF THE INVENTION

The invention relates to control for the automatic locking of the transfer case of a motor vehicle equipped with a multi-axle drive as a function of the steering angle and the driving speed of the motor vehicle for example. This type of arrangement is known from DE-OS 35 05 455and corresponding U.S. Pat. No. 4,681,185. It concerns a vehicle having a multi-axle drive with a transfer transmission and locks for the transfer transmission and for the differential gears. In this case, the connecting of the transfer transmission and of the locks takes place automatically as a function of several criteria which characterizes the moving condition of the vehicle and include steering angle and driving speed. Among the criterion for example, is a reference quantity of the rotational speeds of the wheels of one axle.

In the technical field of drives, concepts that have a multi-axle drive are known to be very efficient. A disadvantage in the case of low adhesion coefficients is a spinning of the wheels which results in a loss of lateral control and impairs the driving stability considerably. As a remedy, a wheel slip control of all driven wheels is known and corresponding U.S. patent application Ser. No. 912,321 (DE-OS 35 34 443). This is very effective but also very costly. It is the objective of the present invention to provide for the known, very costly combination of the multi-axle drive and a wheel slip control of all driven wheels an alternative solution that is just as effective but much less costly.

According to the invention, this objective is achieved by a control for the lock of a transfer transmission on an automatic vehicle with multiple axle drive using both the lock control signal generated as a function of steering angle and drive speed as well as the control signal from the antislip system. A logic is provided for providing the locking control when either a lock control signal is generated by the standard transfer transmission control lock system or by the control signal of the antislip system. The antislip system output control generally include a brake torque control and an engine torque control signal. As a result, at least the costly differential gear locks and the electronic control system and the hydraulic brake system of the wheel slip control can be saved for the wheels of one axle. In addition, only one brake circuit must be connected with one pressure reservoir. The connecting of the transfer transmission lock, in addition, has advantages with respect to driving dynamics that apply particularly in the case of obstacle-avoidance maneuvers or when driving turns in the case of low adhesion coefficients.

Other objects, advantages and novel features of the present invention will become apparent from the following detailed description of the invention when considered in conjunction with the accompanying drawings.

BRIEF DESCRIPTION OF THE DRAWINGS

The FIGURE is a block diagram of a control system for an automatic locking transfer transmission incorporating the principles of the present invention.

DETAILED DESCRIPTION OF THE DRAWINGS

The drawing, in diagram form, shows the drive train of a motor vehicle with all-wheel drive. The vehicle engine 1, including power control element la which is represented as a throttle valve, acts on a transfer transmission 3 that is equipped with an electro-pneumatic lock 3a, via a step gear 2. The transfer transmission 3 is connected via a differential gear 4, 5 to the front wheels 6,7 and the rear wheels 8, 9 respectively. A rotational speed sensor 10, 11, 12 and 13 is assigned to each wheel. Wheel brakes 14 and 15 for the rear wheels 8 and 9 are shown as disk brakes, for example.

The vehicle is equipped with a wheelslip control system ASR that is known, for example DE OS 35 34 443, the electronic system of which is represented diagrammatically as a box 16. The rotational speed signals of the rotational speed sensors are fed to the electronic system 16. In the case of the occurrence of a slip, the electronic system 16 uses them in a known way to form the control signals for the wheel brakes 14, 15 of the rear wheels via braking torque regulators 17, 18. The hydraulic part of these brakes (the brake pedal, the brake cylinder, the pressure reservoir, the brake valves, etc.), for reasons of clarity, are not shown. The effect of the brake signal B and of the wheel slip control system on the wheel brakes is shown diagrammatically. The electronic system 16 also forms control signals which, via a torque regulator 19, affect the power control element la in the sense of a reduction of the driving power, when both rear wheels tend to spin simultaneously.

In addition, an electronic unit 20 is provided to which the rotational speed signals of the front wheel rotational speed sensors 10 and 11 as well as a steering angle signal from a steering angle sensor 21 which is proportional to the steering angle of the front wheels.

The electronic unit 20, that is described in detail in DE-OS 35 05 455, and commonly assigned, U.S. patent application Ser. No. 828,275 filed Feb. 11, 1986 now U.S. Pat. No. 4,681,185, evaluates the rotational speed difference of the front wheels and compares it with the driving speed that is also derived from the front wheel speeds and limit values assigned to the steering angle. When these are exceeded, an output signal is emitted. This criterion responds irrespective of slip criterion of the wheel-slip controlled rear wheels if, for example, a front wheel spins or if the vehicle, without longitudinal acceleration, drives into a correspondingly narrow turn and measures, for example, also counter steering motions in turns that are driven rapidly.

The output signals of the electronic unit 20 and of the wheel slip control 16, the control signals for the braking torque regulator 17 and 18 as well as for the engine torque regulator 19, are fed to the four inputs of an OR-gate 22, the output signal of which is the control signal for the electropneumatic lock 3aof the transfer transmission 3.

Therefore, the lock of the transfer transmission will always be connected when an output signal of the electronic unit 20 is present or the wheel slip control system 16 responds.

If the lock 3a of the transfer transmission 3 is connected, the front axle is frictionally connected with the rear axle. The corresponding braking torque from the rear axle will then at the same time also affect the front wheels. If a front wheel, during the locking of the transfer transmission receives a speed deviation with respect to the vehicle speed or the reference speed, the torque regulator 19 will be connected via the wheel slip control system 16 which results in a reduction of the driving torque.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Control for an automatic locking of the transfer transmission of a motor vehicle equipped with a multi-axle drive as a function of a quantity characterizing the moving condition signal including the steering angle and the driving speed, of the motor vehicle comprising:
    a wheel slip control means for generating control signals to control, via braking torque regulators, the wheel brakes of an axle and, via an engine torque regulator, the power control element of the engine; and
    an OR-gate means for receiving the quantity characterizing the moving condition signal and the control signals for the wheel brakes and the power control element and for generating an output signal, which is the locking signal, led to the transfer transmission lock, for the presence of any received signal in addition to wheel slip control by said wheel slip control means.

2. A control for an automatic locking of the transfer transmission of a motor vehicle equipped with multi-axle drive comprising:
    first means for monitoring the steering angle and driving speed of said motor vehicle and generating a first lock control signal;
    second means for monitoring the speed of the wheels of said vehicle and generating antislip control signals, including brake torque control signals to activate a brake and engine torque control signals to reduce engine torque; and
    logic means for receiving said first lock control signal and said antislip control signals and for providing a second lock control signal to said lock of said transfer transmission when a control signal is present in addition to antislip control by second means.

* * * * *